Patented May 11, 1954

2,678,258

UNITED STATES PATENT OFFICE 2,678,258

METHOD OF PRODUCING CHLORAMINE AND HYDRAZINE

John F. Haller, Niagara Falls, N. Y., assignor to Mathieson Chemical Corporation, a corporation of Virginia No Drawing. Application December 31, 1949, Serial No. 136,410

4 Claims. (Cl. 23—190)

My invention relates to the reaction of ammonia and chlorine to produce chloramine and hydrazine. In one aspect it concerns the production of chloramine in a form suitable for conversion to hydrazine in an improved manner. In another aspect it concerns improvements in the production of hydrazine from ammonia by a simple two-stage reaction with chlorine and chloramine.

Hydrazine can be and is commercially produced by the Raschig synthesis involving indirect production of chloramine from a hypochlorite in aqueous medium followed by conversion to hydrazine. The hydrazine, however, is produced as a hydrate in very weak concentration; e. g. 1 to 1.5 per cent. Elaborate and expensive concentrating, absorbing and dehydrating procedures are required. Hydrazine production by direct oxidation of ammonia by means of chlorine has seemed to me to be a more direct method, but the reaction of chlorine and ammonia is well-known to be violent and apparently uncontrollable. It proceeds to form nitrogen trichloride which decomposes with explosive violence. The present invention is based on my discovery that hydrazine production from chlorine and ammonia is possible if the rate and conditions of reaction are controlled to give chloramine followed by further reaction to produce hydrazine. To slow down the rate of reaction I react chlorine with ammonia in an inert solvent at a temperature controlled below room temperature. E. g., a convenient temperature is about 0° C. I have found that the solvent must have good selective solubility for chloramine and selective insolubility for the co-product, ammonium chloride. The latter appears to contribute markedly to decomposition of chloramine and should be removed relatively rapidly from the reaction environment. I have found that carbon tetrachloride is a specially useful solvent in which either chlorine or ammonia can be dissolved initially and from which ammonium chloride is selectively precipitated as the reaction proceeds.

Thus according to my invention, a solution of chloramine is produced by reacting chlorine with an excess of ammonia in carbon tetrachloride solution under controlled conditions of mixing and low temperature. The precipitated ammonium chloride is separated from the solution.

I have discovered that the solution of chloramine then can be contacted with strong aqueous ammonia to produce hydrazine. According to my invention, the chloramine solution is mixed with an excess of concentrated ammonium hydroxide, advantageously in the presence of a small amount of glue; e. g. 1 or 2 parts per 10 parts NH$_4$OH to assist intimacy of contact between the organic and aqueous phases. Several minutes time at least is allowed for the reaction to proceed, and the mixture is preferably agitated. The mixture may be warmed to promote reaction rate but the temperature rise is controlled to avoid temperatures appreciably above room temperature. The solvent is separated from the reaction mixture for drying and recycle, and the hydrazine product is recovered from the aqueous phase.

In the practice of my invention, other inert organic solvents may be used than carbon tetrachloride. The halogenated organic solvent should contain a sufficiently high proportion of chlorine that that element will not react with it readily. Suitable solvents include, for example, pentachloroethane, tetrachloroethylene, fluorotrichloromethane and the like.

In the preparation of chloramine in the chlorinated solvent, chlorine and ammonia may be added in any of several ways with the precaution that ammonia is always present in excess. For example, chlorine and ammonia may be separately bubbled into a column of carbon tetrachloride taking care that the gases are not admixed before they dissolve and that the ammonia is always in stoichiometric excess. Alternatively, carbon tetrachloride may be saturated with ammonia gas in one container and another portion of solvent saturated with chlorine in another, subsequently mixing these solutions in such proportions that an excess of ammonia is present at all times. The reaction is usually carried out at room temperature or preferably below in order to avoid decomposition of the chloramine. The reaction to form chloramine is extremely rapid at room temperatures and the ammonium chloride precipitates completely from the carbon tetrachloride.

I have found that it is important to separate the chloramine solution from the precipitated ammonium chloride as promptly as possible after it is formed in order to obtain satisfactory yields of chloramine. This may readily be done by filtration or decantation. When the precipitated ammonium chloride is allowed to remain in contact with the chloramine solution, I have found that the yield of chloramine based on the chlorine used, may fall to as low as about 10 per cent.

For the hydrazine preparation step, the carbon tetrachloride solution of chloramine is admixed with an excess of concentrated ammonium hydroxide, advantageously the 28 per cent aqueous ammonia of commerce. Lower concentrations of aqueous ammonia may be used but it is important to use an excess of ammonia over that required theoretically to react with the chloramine to form hydrazine. Lower concentrations of aqueous ammonia are effective, but result in more dilute hydrazine solutions and this is usually economically disadvantageous. The use of more concentrated ammonia solutions entails the use of pressure.

The carbon tetrachloride is separated from the aqueous portion of the reaction mixture, dried and returned to the beginning of the process for the preparation of further solutions of ammonia and chlorine. The aqueous hydrazine contains ammonium chloride dissolved therein and the hydrazine may be separated in known ways. For example, either quick lime or slaked lime in the form of solid, slurry or solution may be added to liberate the ammonia and the whole distilled. The overhead is refractionated to separate ammonia, hydrazine hydrate and water. Alternatively, the ammonia may be separated and the dilute hydrazine recovered as shown, for example, in co-pending application Serial No. 781,644 of John E. Weiler filed October 23, 1947. The method disclosed and claimed therein is absorption of the hydrazine from the dilute aqueous mixture by means of a saturated solution of hydrazine sulfate maintained at the boiling point. The excess water is removed as vapor and the resulting slurry of dihydrazine sulfate is conventionally dried, and the hydrazine released by reaction with excess liquid ammonia.

The principles underlying my invention are illustrated by the following examples. The examples, however, are laboratory scale and are not intended to be limiting with respect to proportions and actual handling of materials.

Example I

Anhydrous ammonia gas was bubbled through a column of carbon tetrachloride while a solution of chlorine in carbon tetrachloride was slowly added to the mixture. A white flocculent precipitate of ammonium chloride formed and was removed by filtration. The filtrate contained excess ammonia. A test portion of the solution was extracted with water and the water layer separated. The addition of potassium iodide resulted in liberation of a large amount of iodine indicating a high concentration of chloramine.

Example II

Carbon tetrachloride was purified by passage through activated alumina. A solution of chlorine in carbon tetrachloride was prepared which, on titration, showed 0.8330 milli-equivalent per ml. A solution of ammonia in carbon tetrachloride was prepared which, on titration, showed 0.3181 milli-equivalent.

One part by volume of the chlorine solution at 0° C. was slowly introduced into 3 parts of the ammonia solution at 0° C. in an ice bath. A crystalline precipitate of ammonia chloride formed at once. A test portion was then shaken with 50 parts of water containing acidified potassium iodide, and titrated with N/10 thiosulfate solution. The titration indicated that the yield of chloroamine was 63 per cent based on the chlorine added.

With 2.60 parts of ammonia solution to 1 part of chlorine a yield of 55 per cent was observed. With 4 parts of ammonia solution to 1 part of chlorine solution, 42 per cent chloramine yield was observed. I believe that the yield of chloramine is higher with a small excess of ammonia, and that the yield is decreased by still more excess ammonia.

Example III

The chloramine solution produced in Example I was shaken with a small amount of 28 per cent ammonium hydroxide containing a small amount of glue. The aqueous layer was separated and analyzed for the presence of hydrazine by addition of iodine to the aqueous layer and back titration with thiosulfate. An extensive reducing effect was observed, showing that hydrazine equivalent to 6 parts by volume of N/10 iodine solution was produced for 10 parts of original chlorine solution.

I claim:

1. The method of producing a solution of chloramine which comprises reacting chlorine with an excess of ammonia in an inert halogenated solvent at a temperature below room temperature and separating precipitated ammonium chloride.

2. The method of claim 1 where the solvent is carbon tetrachloride.

3. The method of producing hydrazine which comprises reacting chlorine with an excess of ammonia in a ninert halogenated solvent at a temperature below room temperature, separating precipitated ammonium chloride, contacting the resulting solution with concentrated ammonium hydroxide while controlling the temperature at about room temperature, separating the solvent from the aqueous phase and recovering the hydrazine from the aqueous phase.

4. The method of claim 3 where the solvent is carbon tetrachloride.

No references cited.